(12) United States Patent
Wang et al.

(10) Patent No.: US 9,930,601 B2
(45) Date of Patent: Mar. 27, 2018

(54) FILTERING OF SIGNAL PARAMETER VALUES REPORTED IN A MEASUREMENT REPORT

(71) Applicant: Verizon Patent and Licensing Inc., Arlington, VA (US)

(72) Inventors: Xin Wang, Morris Plains, NJ (US); Andrew E. Youtz, Princeton, NJ (US); Lily Zhu, Parsippany, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 46 days.

(21) Appl. No.: 15/161,937

(22) Filed: May 23, 2016

(65) Prior Publication Data

US 2017/0339618 A1  Nov. 23, 2017

(51) Int. Cl.
| | |
|---|---|
| *H04W 36/30* | (2009.01) |
| *H04W 24/08* | (2009.01) |
| *H04W 24/10* | (2009.01) |
| *H04W 36/08* | (2009.01) |
| *H04L 5/00* | (2006.01) |
| *H04W 36/00* | (2009.01) |

(52) U.S. Cl.
CPC ........... *H04W 36/30* (2013.01); *H04L 5/0048* (2013.01); *H04W 24/08* (2013.01); *H04W 24/10* (2013.01); *H04W 36/0061* (2013.01); *H04W 36/08* (2013.01)

(58) Field of Classification Search
CPC . H04W 36/30; H04W 36/0061; H04W 24/10; H04W 24/08; H04W 36/08; H04L 5/0048
See application file for complete search history.

(56) References Cited

U.S. PATENT DOCUMENTS

| | | | |
|---|---|---|---|
| 9,319,914 B2 * | 4/2016 | Narasimha | ............ H04W 24/10 |
| 2010/0273487 A1 * | 10/2010 | Alonso-Rubio | .... H04W 36/385 455/436 |
| 2016/0227571 A1 * | 8/2016 | Baek | ..................... H04W 16/14 |

OTHER PUBLICATIONS

3rd Generation Partnership Project, "3GPP TS 36.331 V8.0.0: Evolved Universal Terrestrial Radio Access (E-UTRA) Radio Resource Control (RRC)," Dec. 2007, 56 pages.

* cited by examiner

*Primary Examiner* — Mohammad S Anwar (57) ABSTRACT

A user equipment may determine an initial signal parameter value of a signal received from a base station. The user equipment may determine one or more subsequent signal parameter values corresponding to one or more signals received from the base station. The one or more subsequent signal parameter values may be measured after the initial signal parameter value. The user equipment may calculate a filtered signal parameter value based on the initial signal parameter value and the one or more subsequent signal parameter values. Each signal parameter value, of the one or more subsequent signal parameter values, may be weighted by an amount greater than or equal to a previously measured signal parameter value. The user equipment may provide the filtered signal parameter value in a measurement report.

20 Claims, 6 Drawing Sheets

FILTERING OF SIGNAL PARAMETER VALUES REPORTED IN A MEASUREMENT REPORT

BACKGROUND

User equipment (UE) for a cellular network (e.g., a Long-Term Evolution (LTE) network) may measure various parameters associated with the connection strength or quality between the UE and a base station of the cellular network (e.g., an eNodeB). For example, the UE may measure a Reference Signal Received Power (RSRP) parameter, a Reference Signal Received Quality (RSRQ) parameter, a Received Signal Strength Indicator (RSSI) parameter, or the like. The UE may report values for these measurements, in a measurement report, to the base station. The base station may send information to configure the UE based on information included in the measurement report. For example, handover decisions from one base station to another may be based on information included in the measurement report.

DETAILED DESCRIPTION OF PREFERRED EMBODIMENTS

The following detailed description of example implementations refers to the accompanying drawings. The same reference numbers in different drawings may identify the same or similar elements.

User equipment (UE) for a cellular network (e.g., a mobile phone, a tablet device, or the like) may wirelessly access the cellular network via a base station having a particular wireless connection range. The connection between the UE and a serving base station may be handed over to a neighbor base station as the UE traverses between geographic locations. For example, the UE may be handed over from the serving base station to the neighbor base station when the UE relocates to a geographic position in which the neighbor base station provides better service than the serving base station (e.g., when a connection signal strength or quality between the UE and the neighbor base station is higher than that of the UE and the serving base station).

Handovers may be triggered from a serving base station to a neighbor base station based on reported signal parameters values for reference signals periodically received by the UE from the serving base station and/or the neighbor base station. For example, the UE may measure signal parameter values associated with reference signals periodically transmitted by the serving base station and one or more neighbor base stations and received by the UE when the UE is within wireless communications range of the neighbor base station(s). The UE may measure signal parameter values, such as a Reference Signal Received Power (RSRP) value, a Reference Signal Received Quality (RSRQ) value, a Received Signal Strength Indicator (RSSI) value, or the like. Handover decisions may be based on a reported signal parameter value, which may be determined based on multiple measured signal parameter values.

According to Third Generation Partnership Program (3GPP) standards, when determining the reported signal parameter values used to make handover decisions, an initial measured signal parameter value (e.g., measured by a UE) is given more weight than subsequent measured signal parameter values. In some situations, the technique used to determine the reported signal value may result in relatively poor handover decisions if the signal parameter value significantly changes after the initial measurement. For example, if the initial measurement of a signal parameter for a neighbor base station is relatively high compared to subsequent measurements, the UE may undergo handover from a serving base station to the neighbor base station too early even though the service provided by the neighbor base station may be of lower quality than that of the serving base station. Conversely, if the initial measurement is relatively low compared to subsequent measurements, the UE may undergo handover to a neighbor base station too late. In turn, the UE may experience handover failure, radio link failure, poor data transmission and latency performance, and/or poor audio or video calling quality (e.g., gaps in voice audio or video for Voice over Long Term Evolution (VoLTE) telephone calls).

Implementations described herein may apply a different (e.g., lower) weight to the initial signal parameter value measured by the UE (as compared to the 3GPP standard). As a result, handover decisions are improved, thereby resulting in a better user experience when a UE is handed over from one base station to another (e.g., improved data transmission and latency performance, reduced audio/video gaps during telephone calls, or the like), improved call quality, fewer network errors, and a conservation of network resources (e.g., by not having to recover from handover failures).

Figure 1A:
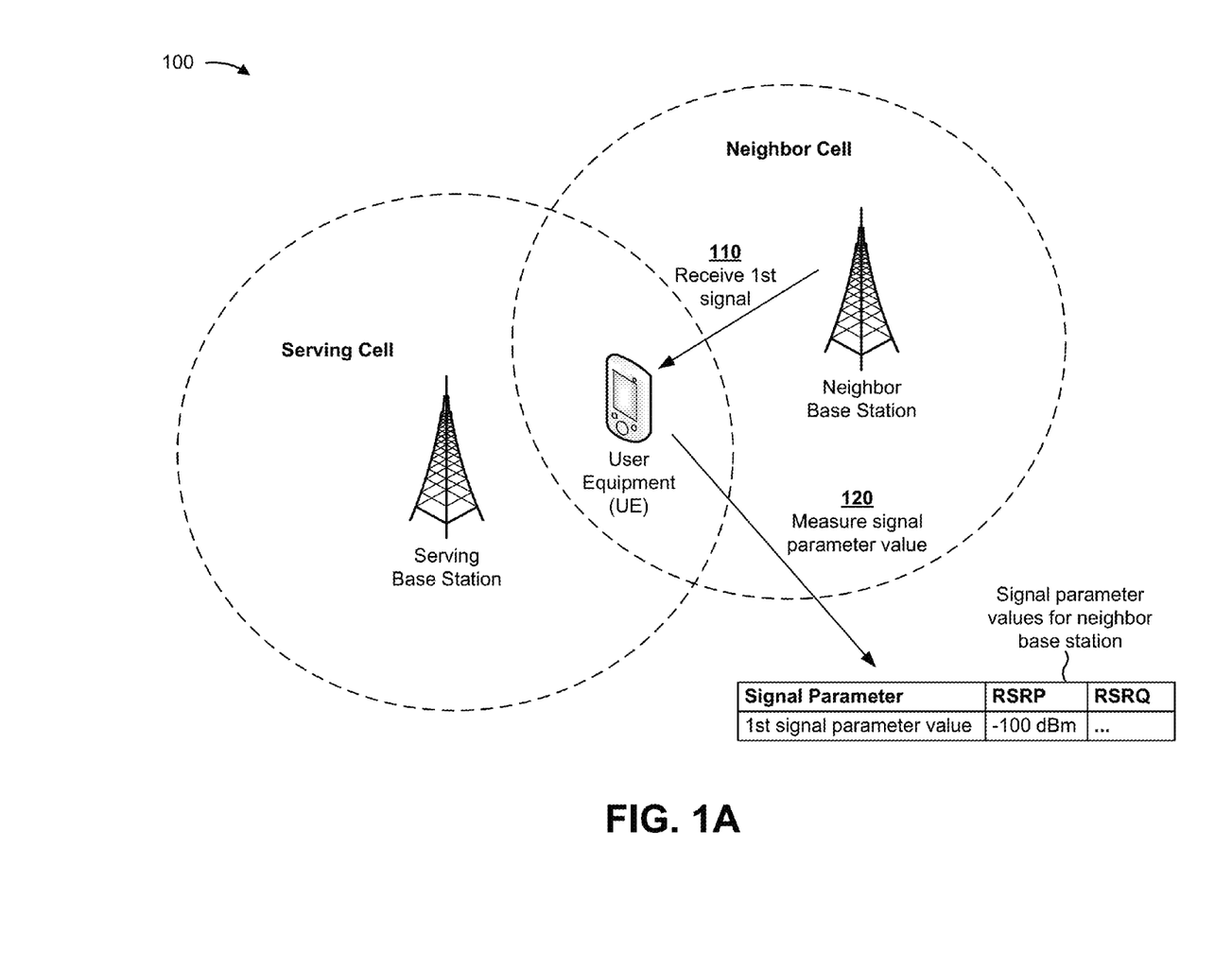
FIGS. 1A-1C are diagrams of an overview of an example implementation described herein.
Figure 1B:
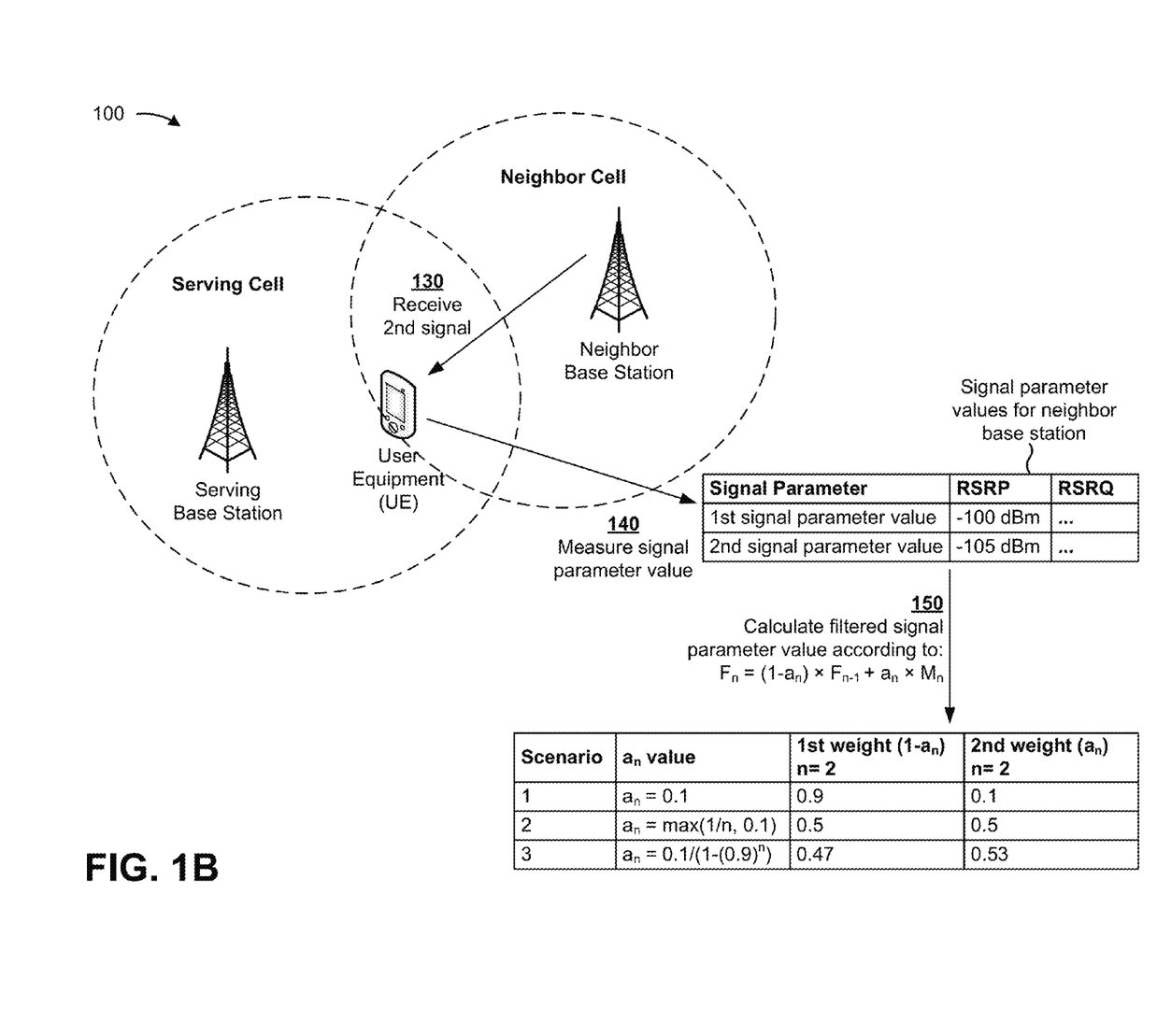
Figure 1C:
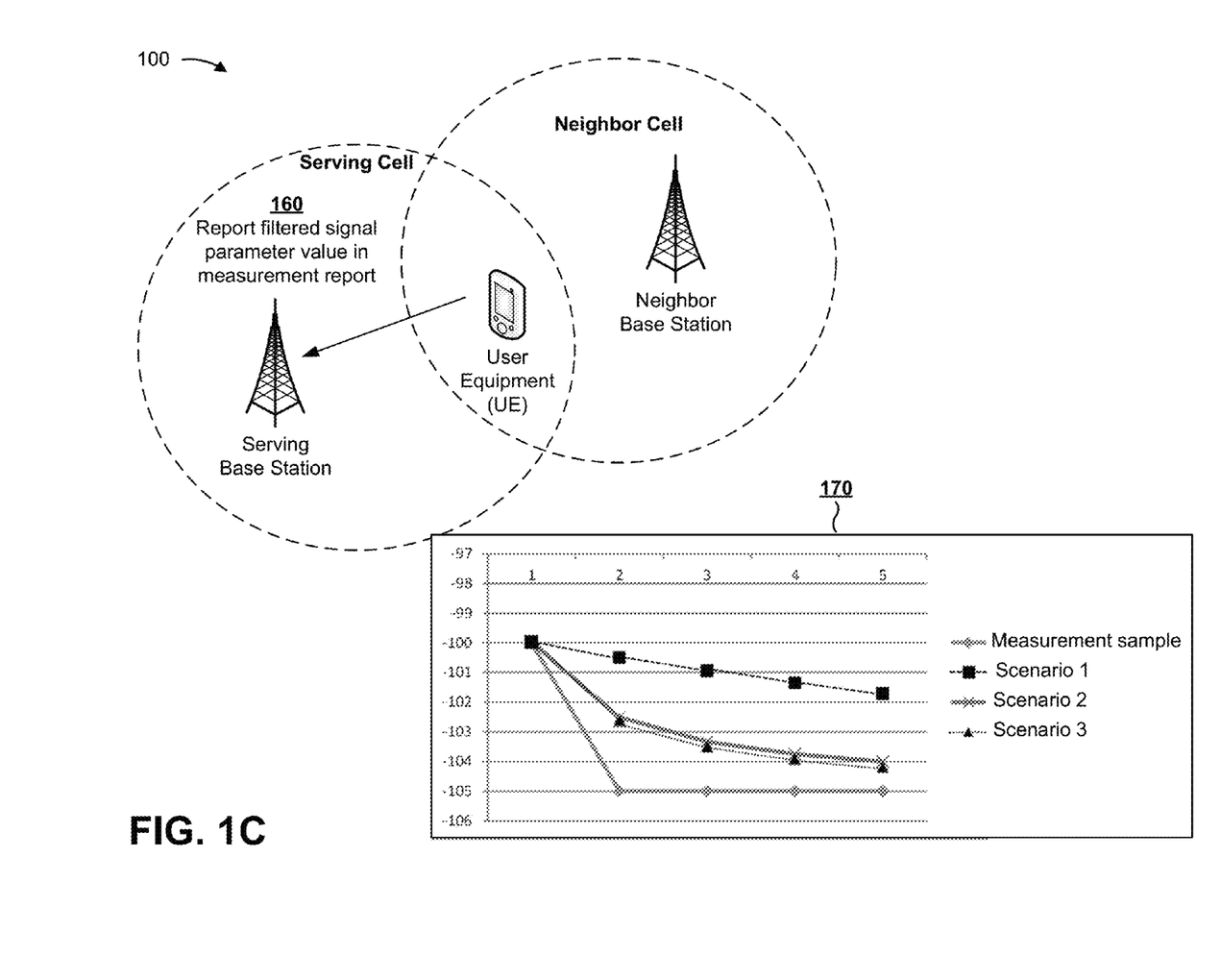

FIGS. 1A-1C are diagrams of an overview of an example implementation 100 described herein. As shown in FIG. 1A, a UE may be located within wireless communication range (e.g., a cell) of a serving base station (e.g., a base station currently connected to and serving the UE) and a neighbor base station. As shown by reference number 110, the UE may receive a first signal from the neighbor base station. The first signal may be a reference signal that is received when the UE is within wireless communication range of the neighbor base station. As shown by reference number 120, the UE may determine (e.g., measure) a value of the first signal parameter (e.g., a first signal parameter value) of the first signal received from the neighbor base station. As an example, assume that the UE measures an RSRP value of −100 decibel-milliwatts (dBm). Additionally, or alternatively, the UE may measure the value of a different signal parameter, such as RSRQ. As described in greater detail herein, the first signal parameter value may be determined based on an initial measurement to be used to calculate a filtered signal parameter value to be reported in a measurement report.

As shown in FIG. 1B, and by reference number 130, the UE may receive a second signal from the neighbor base station (e.g., a second reference signal received after the first signal). As shown by reference number 140, the UE may measure a signal parameter value of the second signal (e.g., a second signal parameter value) of the second signal received from the neighbor base station. As an example, assume that the UE measures an RSRP value of −105 dBm.

The second signal parameter value may be determined based on a next consecutive measurement following the initial measurement.

As shown by reference number 150, the UE may calculate a filtered signal parameter value. In some implementations, the UE may calculate the filtered signal parameter value based on the first signal parameter value and the second signal parameter value. For example, the UE may apply a first weight value to the first signal parameter value, and may apply a second weight value to the second signal parameter value. In some implementations, the UE may weight the first signal parameter value differently than the second signal parameter value. For example, the UE may apply the second weight value to weight the second signal parameter value by an amount greater than or equal to applying the first weight to the first signal parameter value. The UE may calculate the filtered signal parameter value based on applying the first weight value to the first signal parameter value and applying the second weight value to the second signal parameter value.

In some implementations, different filtered signal parameter values may be calculated for different scenarios. For example, in one scenario, shown as Scenario 1, the first weight (e.g., the weight of the first signal parameter value, shown as $1-a_n$) is 0.9, and the second weight (e.g., the weight of the second signal parameter value, shown as $a_n$) is 0.1. That is, the first weight may be greater than the second weight, as may be the case according to the 3GPP standard. In the scenario in which the first weight is greater than the second weight, problems may arise in the handover decisions, as described above.

In a second scenario, shown as Scenario 2, the first weight and the second weight may be equal (e.g., both weights may be 0.5). In a third scenario, shown as Scenario 3, the second weight may be greater than the first weight. Adjusting the weights so that the second weight is equal to or greater than the first weight may result in a more accurate reporting of signal parameter values in measurement reports, which in turn may lead to improved handover decisions. While two signal parameter values are shown as an example, in some implementations, the UE may calculate the filtered signal parameter value based on more than two signal parameter values.

As shown in FIG. 1C, and by reference number 160, the UE may provide the filtered signal parameter value in a measurement report, such that more intelligent handover decisions may be made based on the measurement report (e.g., as compared to calculating the filtered signal parameter value according to the 3GPP standard). As shown by reference number 170, the filtered signal parameter values calculated according to Scenarios 2 and 3 (e.g., where the initial measurement receives less weight than subsequent measurements) are more closely aligned with the actual measurement samples measured by the UE than Scenario 1 (e.g., where the initial measurement receives more weight than subsequent measurements, as per the 3GPP standard). In this way, the UE may report more accurate signal parameter values in measurement reports, which in turn, leads to improved handover decisions.

In some implementations, various scenarios, signal parameter values, and weights may be considered when generating filtered signal parameter values, as described in more detail elsewhere herein. In some implementations, handover decisions may be based on a single filtered signal parameter value, or a combination of multiple filtered signal parameter values generated based on different weights.

As indicated above, FIGS. 1A-1C are provided merely as an example. Other examples are possible and may differ from what was described with regard to FIGS. 1A-1C.

Figure 2:
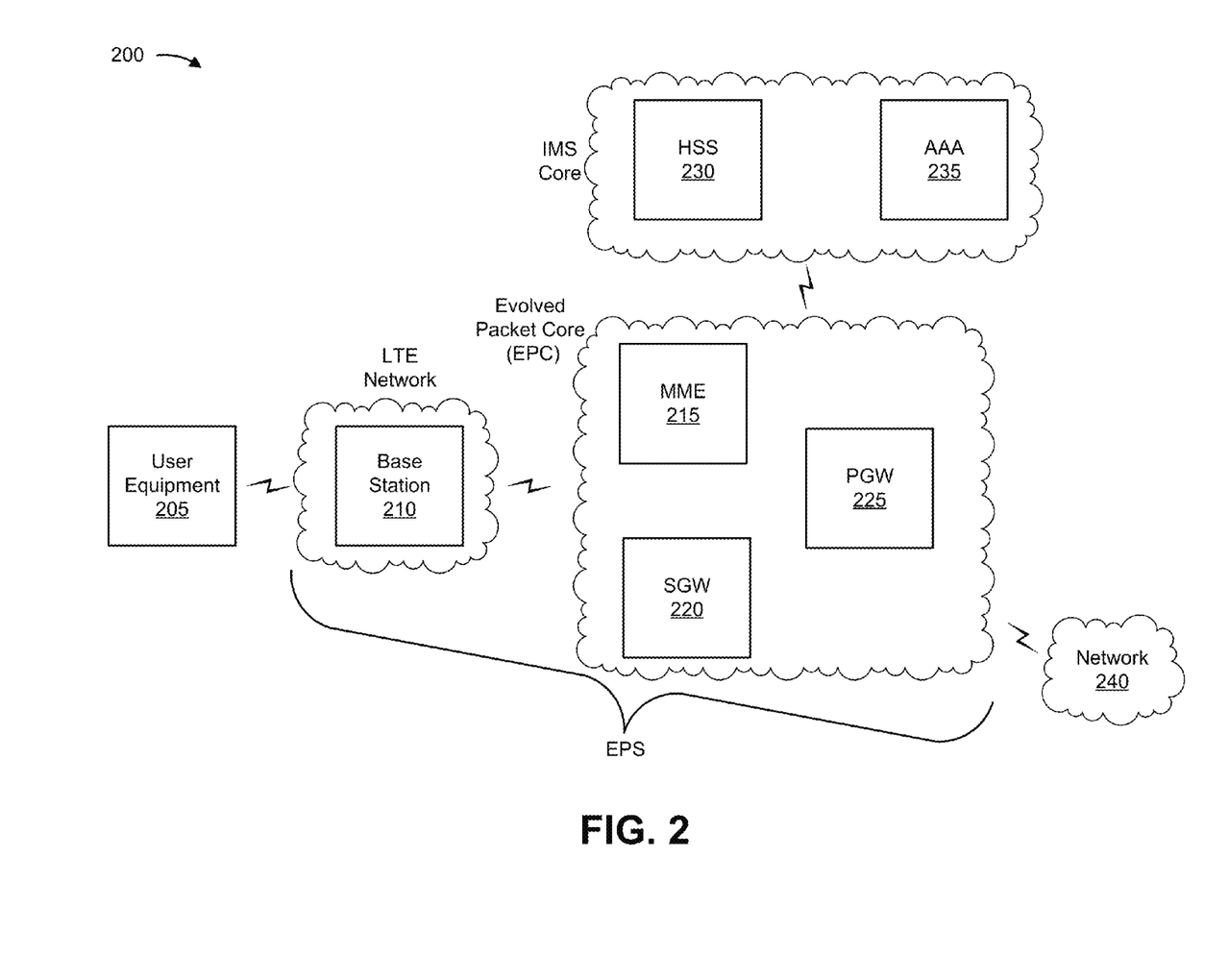
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a user equipment 205, a base station 210, a mobility management entity device (MME) 215, a serving gateway (SGW) 220, a packet data network gateway (PGW) 225, a home subscriber server (HSS) 230, an authentication, authorization, and accounting server (AAA) 235, and a network 240. Devices of environment 200 may interconnect via wired connections, wireless connections, or a combination of wired and wireless connections.

Some implementations are described herein as being performed within a long term evolution (LTE) network for explanatory purposes. Some implementations may be performed within a network that is not an LTE network, such as a third generation (3G) network or a code division multiple access (CDMA) network.

Environment 200 may include an evolved packet system (EPS) that includes an LTE network and/or an evolved packet core (EPC) that operate based on a third generation partnership project (3GPP) wireless communication standard. The LTE network may include a radio access network (RAN) that includes one or more base stations 210 that take the form of evolved Node Bs (eNBs) via which user equipment 205 communicates with the EPC. The EPC may include MME 215, SGW 220, and/or PGW 225 that enable user equipment 205 to communicate with network 240 and/or an Internet protocol (IP) multimedia subsystem (IMS) core. The IMS core may include HSS 230 and/or AAA 235, and may manage device registration and authentication, session initiation, etc., associated with user equipment 205. HSS 230 and/or AAA 235 may reside in the EPC and/or the IMS core.

User equipment 205 includes one or more devices capable of communicating with base station 210 and/or a network (e.g., network 240). For example, user equipment 205 may include a wireless communication device, a radiotelephone, a personal communications system (PCS) terminal (e.g., that may combine a cellular radiotelephone with data processing and data communications capabilities), a smart phone, a laptop computer, a tablet computer, a personal gaming system, a wearable communication device (e.g., a smart wrist watch, a pair of smart eyeglasses, etc.), and/or a similar device. User equipment 205 may send traffic to and/or receive traffic from network 240 (e.g., via base station 210, SGW 220, and/or PGW 225).

Base station 210 includes one or more devices capable of transferring traffic, such as audio, video, text, and/or other traffic, destined for and/or received from user equipment 205. In some implementations, base station 210 may include an eNB associated with the LTE network that receives traffic from and/or sends traffic to network 240 via SGW 220 and/or PGW 225. Additionally, or alternatively, one or more base stations 210 may be associated with a RAN that is not associated with the LTE network. Base station 210 may send traffic to and/or receive traffic from user equipment 205 via an air interface. In some implementations, base station 210 may include a small cell base station, such as a base station of a microcell, a picocell, and/or a femtocell.

MME 215 includes one or more devices, such as one or more server devices, capable of managing authentication, activation, deactivation, and/or mobility functions associated with user equipment 205. In some implementations, MME 215 may perform operations relating to authentication of user equipment 205. Additionally, or alternatively, MME 215 may facilitate the selection of a particular SGW 220 and/or a particular PGW 225 to serve traffic to and/or from user equipment 205. MME 215 may perform operations associated with handing off user equipment 205 from a first base station 210 to a second base station 210 when user equipment 205 is transitioning from a first cell associated with the first base station 210 to a second cell associated with the second base station 210 (e.g., handover decisions). Additionally, or alternatively, MME 215 may select another MME (not pictured), to which user equipment 205 should be handed off (e.g., when user equipment 205 moves out of range of MME 215).

SGW 220 includes one or more devices capable of routing traffic. For example, SGW 220 may include one or more data processing and/or traffic transfer devices, such as a gateway, a router, a modem, a switch, a firewall, a network interface card (NIC), a hub, a bridge, a server device, an optical add/drop multiplexer (OADM), or any other type of device that processes and/or transfers traffic. In some implementations, SGW 220 may aggregate traffic received from one or more base stations 210 associated with the LTE network, and may send the aggregated traffic to network 240 (e.g., via PGW 225) and/or other network devices associated with the EPC and/or the IMS core. SGW 220 may also receive traffic from network 240 and/or other network devices, and may send the received traffic to user equipment 205 via base station 210. Additionally, or alternatively, SGW 220 may perform operations associated with handing off user equipment 205 to and/or from an LTE network.

PGW 225 includes one or more devices capable of providing connectivity for user equipment 205 to external packet data networks (e.g., other than the depicted EPC and/or LTE network). For example, PGW 225 may include one or more data processing and/or traffic transfer devices, such as a gateway, a router, a modem, a switch, a firewall, a NIC, a hub, a bridge, a server device, an OADM, or any other type of device that processes and/or transfers traffic. In some implementations, PGW 225 may aggregate traffic received from one or more SGWs 220, and may send the aggregated traffic to network 240. Additionally, or alternatively, PGW 225 may receive traffic from network 240, and may send the traffic to user equipment 205 via SGW 220 and base station 210. PGW 225 may record data usage information (e.g., byte usage), and may provide the data usage information to AAA 235.

HSS 230 includes one or more devices, such as one or more server devices, capable of managing (e.g., receiving, generating, storing, processing, and/or providing) information associated with user equipment 205. For example, HSS 230 may manage subscription information associated with user equipment 205, such as information that identifies a subscriber profile of a user associated with user equipment 205, information that identifies services and/or applications that are accessible to user equipment 205, location information associated with user equipment 205, a network identifier (e.g., a network address) that identifies user equipment 205, information that identifies a treatment of user equipment 205 (e.g., quality of service information, a quantity of minutes allowed per time period, a quantity of data consumption allowed per time period, etc.), and/or similar information. HSS 230 may provide this information to one or more other devices of environment 200 to support the operations performed by those devices.

AAA 235 includes one or more devices, such as one or more server devices, that perform authentication, authorization, and/or accounting operations for communication sessions associated with user equipment 205. For example, AAA 235 may perform authentication operations for user equipment 205 and/or a user of user equipment 205 (e.g., using one or more credentials), may control access, by user equipment 205, to a service and/or an application (e.g., based on one or more restrictions, such as time-of-day restrictions, location restrictions, single or multiple access restrictions, read/write restrictions, etc.), may track resources consumed by user equipment 205 (e.g., a quantity of voice minutes consumed, a quantity of data consumed, etc.), and/or may perform similar operations.

Network 240 includes one or more wired and/or wireless networks. For example, network 240 may include a cellular network (e.g., an LTE network, a 3G network, a CDMA network, etc.), a public land mobile network (PLMN), a wireless local area network (e.g., a Wi-Fi network), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
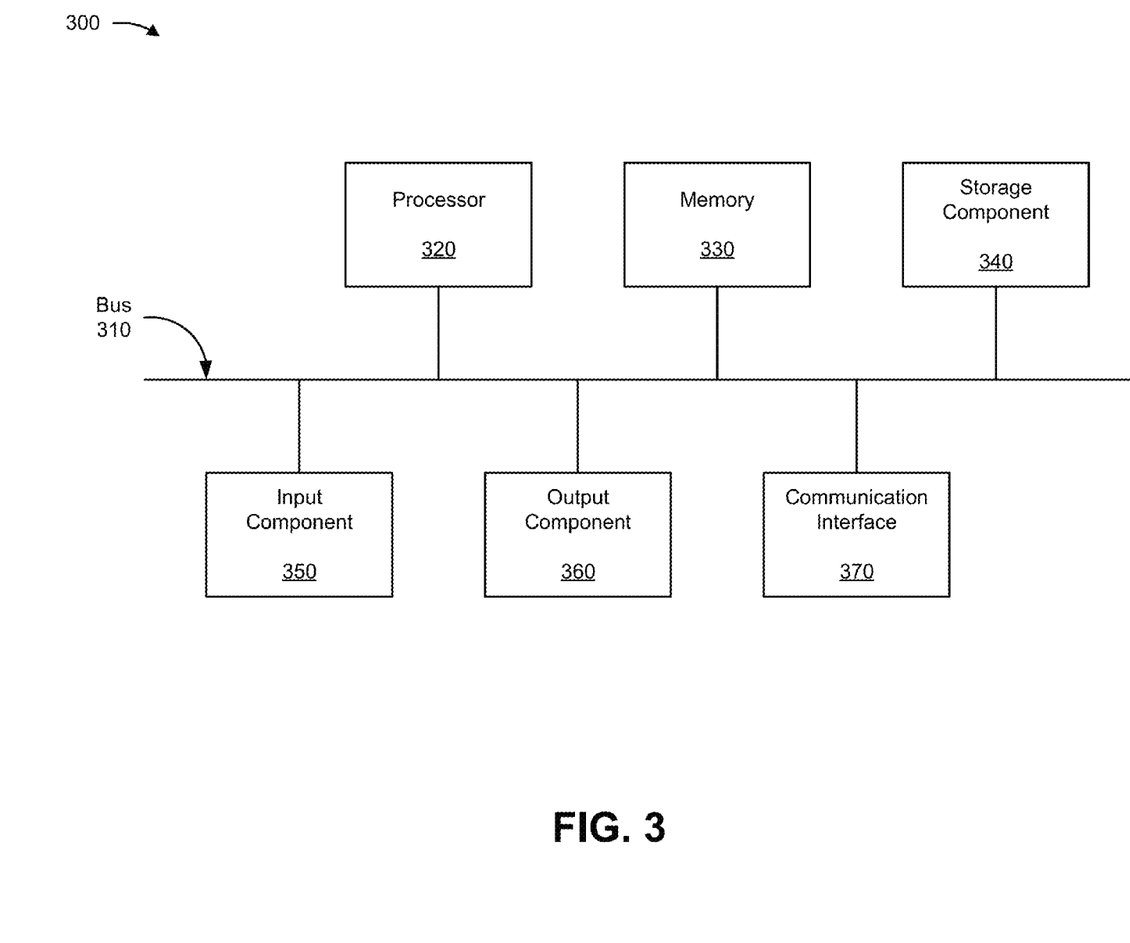
FIG. 3 is a diagram of example components of one or more devices of FIG. 2.

FIG. 3 is a diagram of example components of a device 300. Device 300 may correspond to user equipment 205, base station 210, MME 215, SGW 220, PGW 225, HSS 230, and/or AAA 235. In some implementations, user equipment 205, base station 210, MME 215, SGW 220, PGW 225, HSS 230, and/or AAA 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 includes a processor (e.g., a central processing unit (CPU), a graphics processing unit (GPU), and/or an accelerated processing unit (APU)), a microprocessor, a microcontroller, and/or any processing component (e.g., a field-programmable gate array (FPGA) and/or an application-specific integrated circuit (ASIC)) that interprets and/or executes instructions. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
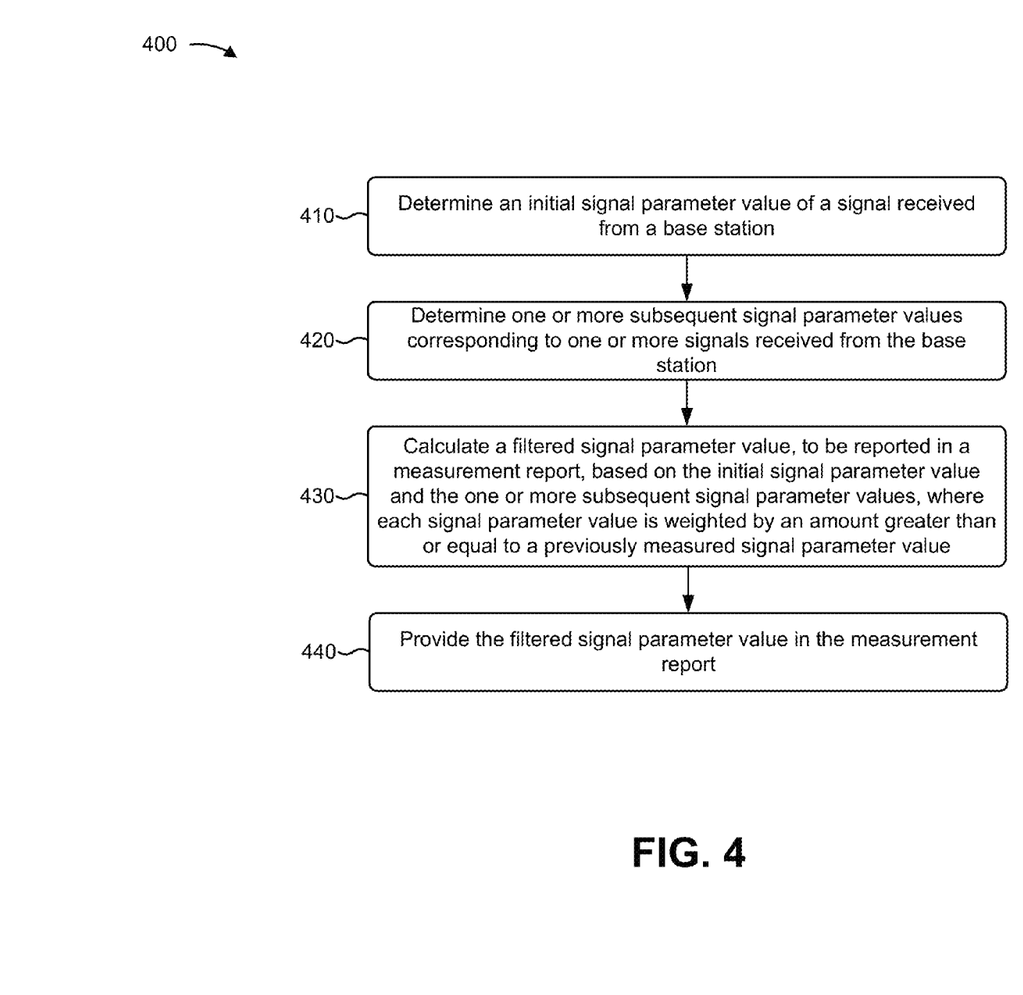
FIG. 4 is a flow chart of an example process for improving filtering of signal parameter values reported in a measurement report.

FIG. 4 is a flow chart of an example process 400 for improving filtering of signal parameter values reported in a measurement report. In some implementations, one or more process blocks of FIG. 4 may be performed by user equipment 205. In some implementations, one or more process blocks of FIG. 4 may be performed by another device or a group of devices separate from or including user equipment 205, such as base station 210, MME 215, SGW 220, PGW 225, HSS 230, and/or AAA 235.

As shown in FIG. 4, process 400 may include determining an initial signal parameter value of a signal received from a base station (block 410). For example, as described herein, UE 205 may determine multiple signal parameter values, and may combine the multiple signal parameter values (e.g., mathematically) to generate a filtered signal parameter value. In some implementations, UE 205 may report the filtered signal parameter value to base station 210 (e.g., in a measurement report) to assist with the performance and/or execution of network procedures, such as handovers, radio resource control (RRC) connections, or the like.

UE 205 may determine an initial signal parameter value based on an initial measurement that is to be combined with other, subsequent measurements to calculate the filtered signal parameter value. For example, the filtered signal parameter value may be calculated based on the initial signal parameter value and one or more subsequent signal parameter values, with the initial signal parameter value being measured by UE 205 prior to measurement of the one or more subsequent signal parameter values. In some implementations, the filtered signal parameter value may not be based on any signal parameter values measured by UE 205 prior to a defined initial signal parameter value.

In some implementations, UE 205 may receive a signal (e.g., a wireless signal, a reference signal, etc.) from base station 210, and may measure a signal parameter of the signal to determine an initial signal parameter value of the signal parameter. A signal parameter may include a parameter associated with a wireless signal, such as a reference signal, between UE 205 and base station 210. For example, the signal parameter may include an RSRP parameter, an RSRQ parameter, a received signal code power (RSCP) parameter, an RSSI parameter, a block error rate (BLER) parameter, a signal-to-interference-plus-noise ratio (SINR) parameter, or the like. The signal parameter may be represented by a signal parameter value (e.g., a value of −100 dBm for an RSRP parameter, a value of −15 dB for an RSRQ parameter, etc.).

In some implementations, UE 205 may receive and measure signal parameter values from one or more base stations 210, such as a serving base station 210 and/or one or more neighbor base stations 210. As described in greater detail below, a measurement report may include filtered signal parameter values for any or all of these base stations 210. While implementations are described herein in connection with a signal parameter value and a base station 210, UE 205 may measure multiple signal parameters (e.g., RSRP, RSRQ, etc.) of a signal received from base station 210, may measure a signal parameter associated with multiple base stations 210, or may measure multiple signal parameters of signals received from multiple base stations 210.

As further shown in FIG. 4, process 400 may include determining one or more subsequent signal parameter values corresponding to one or more signals received from the base station (block 420). For example, UE 205 may determine one or more subsequent signal parameter values. In some implementations, UE 205 may determine each subsequent signal parameter value in a similar manner as is described above with respect to block 410. UE 205 may measure each subsequent signal parameter value after measuring the initial signal parameter value. As described in greater detail below, the initial signal parameter value and the one or more subsequent signal parameter values may be combined (e.g., mathematically) to calculate a filtered signal parameter value.

As described herein, the initial signal parameter value may be a first signal parameter value, and the one or more subsequent signal parameter values may be a second signal parameter value, a third signal parameter value, and so on. In some implementations, UE 205 may determine the initial signal parameter value based on an initial measurement to be used to calculate a filtered signal parameter value to be reported in a measurement report. UE 205 may determine the second signal parameter value based on a next consecutive measurement following the initial measurement, may determine the third signal parameter value based on a next consecutive measurement following measurement of the second signal parameter value, and so on.

As further shown in FIG. 4, process 400 may include calculating a filtered signal parameter value, to be reported in a measurement report, based on the initial signal parameter value and the one or more subsequent signal parameter values, where each signal parameter value is weighted by an amount greater than or equal to a previously measured signal parameter value (block 430). For example, UE 205 may calculate a filtered signal parameter value. In some implementations, UE 205 may use the initial signal parameter value and one or more subsequent signal parameter values to calculate the filtered signal parameter value. For this calculation, UE 205 may apply weights to the different signal parameter values. In some implementations, UE 205 may determine the weights such that more recently measured signal parameter values are weighted equally or more heavily than older signal parameter values.

In particular, UE 205 may apply a first weight value to a first signal parameter value based on an initial measurement, and may apply a second weight value to a second signal parameter value based on a next consecutive measurement after the initial measurement. UE 205 may determine the weight values such that applying the second weight value weights the second signal parameter value by an amount greater than or equal to applying the first weight to the first signal parameter value. In this way, UE 205 may assist in reducing handover issues resulting from weighting the initial signal parameter value too heavily, thereby improving UE performance.

In some implementations, UE 205 may calculate the filtered signal parameter value based on a formula (e.g., an infinite impulse response filter). As an example, UE 205 may calculate the filtered signal parameter value based on the formula:

$$F_n = (1-a_n) \cdot F_{n-1} + a_n \cdot M_n \quad (1)$$

In equation 1, the term $F_n$ may represent the nth filtered signal parameter value, which may be determined by applying a first weight value $(1-a_n)$ to a previously determined filtered signal parameter value $(F_n-1)$ and applying a second weight value $(a_n)$ to the nth signal parameter value $(M_n)$ measured by UE 205. In some implementations, an initial filtered coefficient value (e.g., $F_1$) may be set equal to the initial signal parameter value (e.g., $M_1$). The term an may represent a derived filter coefficient value, which may be used to determine one or more weight values. The term n may represent a sample number (e.g., a quantity of measured signal parameter values).

In some implementations, UE 205 may determine an based on the following formula:

$$a_n = \max(1/n, a) \quad (2)$$

In accordance with formula 2, UE 205 may determine a value of a and a value of 1/n (e.g., the reciprocal of n), and may set $a_n$ equal to whichever value is greater (e.g., a maximum value of a and the reciprocal of n). For example, as in formula 1, the term n may represent a sample number. The term a may represent a derived filter coefficient value, which may be determined based on a filter coefficient k (e.g., as per the 3GPP standard), such as according to the following formula:

$$a = 1/2^{(k/4)} \quad (3)$$

In some implementations, UE 205 may receive a value fork from base station 210, which may configure the value of k. The above technique for determining $a_n$ in accordance with formulas 2 and 3 may weight all signal parameter values (e.g., the initial and subsequent signal parameter values) relatively equally, such that the initial signal parameter value does not skew the filtered signal parameter value.

As another example, UE 205 may determine $a_n$ based on the following formula:

$$a_n = a/[1-(1-a)^n] \quad (4)$$

In formula 4, the term a may represent a derived filter coefficient value, as is described above with respect to formula 2. The term n may represent a sample number, as is described above with respect to formulas 1 and 2.

The above technique for determining $a_n$ in accordance with formula 4 may weight more recently measured signal parameter values more heavily than older signal parameter values, such that the initial signal parameter value does not skew the filtered signal parameter value.

In some implementations, other techniques for determining weight values are possible. For example, UE 205 may select a value for a or k to reduce a weight given to initial signal parameter value as compared to the 3GPP standard (e.g., 3GPP TS 36.331, section 5.5.3.2). In this way, UE 205 may assist in reducing handover issues resulting from weighting the initial signal parameter value too heavily, thereby improving UE 205 handover performance.

As further shown in FIG. 4, process 400 may include providing the filtered signal parameter value in the measurement report (block 440). For example, UE 205 may provide the filtered signal parameter value in the measurement report (e.g., after calculating the filtered signal parameter value). In some implementations, UE 205 may provide the signal parameter value and/or the measurement report to serving base station 210. In some implementations, the measurement report may include filtered signal parameter values for serving base station 210 and/or one or more neighbor base stations 210. In some implementations, the measurement report may include filtered signal parameter values for one or more signal parameters (e.g., RSRP, RSRQ, etc.). In some implementations, base station 210 and/or another network device (e.g., MME 215) may use the measurement report to facilitate one or more network procedures, such as a handover procedure, an RRC procedure, or the like. As a result, a more accurate filtered signal parameter value is reported, thereby reducing handover issues and improving handover performance (e.g., improving data transmission and latency performance, reducing audio/video gaps during VoLTE telephone calls, or the like). These techniques may be used for handover between cells of the same base station 210 (e.g., intra-base station handover), for handover between different base stations 210 (e.g., inter-base station handover), or the like.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein may apply different weights to signal parameter values measured by a UE than as defined according to the 3GPP standard. As a result, the UE may prevent an initial measurement from skewing a reporting filtered signal parameter value, thereby improving handover decisions, network performance (e.g., data transmission and latency performance), and UE performance (e.g., reducing audio/video gaps during telephone calls).

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A user equipment, comprising:
 one or more processors to:
  determine a first signal parameter value of a first signal received from a base station,
   the first signal parameter value being determined based on an initial measurement to be used to calculate a filtered signal parameter value to be reported in a measurement report,
   the initial measurement being a single measurement;
  determine a second signal parameter value of a second signal received from the base station,
   the second signal parameter value being determined based on a next consecutive measurement following the initial measurement,
   the next consecutive measurement being a single measurement;
  apply a first weight value to the first signal parameter value;
  apply a second weight value to the second signal parameter value,
   where the second weight value is greater than or equal to the first weight value;
  calculate the filtered signal parameter value based on applying the first weight value to the first signal parameter value and applying the second weight value to the second signal parameter value; and
  provide the filtered signal parameter value in the measurement report.

2. The user equipment of claim 1, where the one or more processors are further to:
 determine one or more subsequent signal parameter values corresponding to one or more signals received from the base station,
  the one or more subsequent signal parameter values being measured after the first signal parameter value and including the second signal parameter value; and
 where the one or more processors, when calculating the filtered signal parameter value, are to:
  calculate the filtered signal parameter value based on the first signal parameter value and the one or more subsequent signal parameter values,
   each signal parameter value, of the one or more subsequent signal parameter values, being weighted by an amount greater than or equal to a previously measured signal parameter value.

3. The user equipment of claim 1, where the filtered signal parameter value is a first filtered signal parameter value;
 where the one or more processors are further to:
  determine a third signal parameter value of a third signal received from the base station;
  calculate a second filtered signal parameter value based on the first filtered signal parameter value and the third signal parameter value,
   the third signal parameter value being weighted by an amount equal to or greater than the first signal parameter value and the second signal parameter value; and
  provide the second filtered signal parameter value in another measurement report.

4. The user equipment of claim 1, where the filtered signal parameter value does not incorporate any signal parameter values measured prior to the first signal parameter value.

5. The user equipment of claim 1, where the base station is a neighbor base station and where the measurement report is provided to a serving base station.

6. The user equipment of claim 1, where the one or more processors, when providing the filtered signal parameter value in the measurement report, are to:
 provide the filtered signal parameter value to a serving base station, which is different than the base station.

7. The user equipment of claim 1, where the first signal parameter value or the second signal parameter value includes at least one of:
 a reference signal received power (RSRP) parameter value,
 a reference signal received quality (RSRQ) parameter value, or
 a received signal strength indicator (RSSI) parameter value.

8. A non-transitory computer-readable medium storing instructions, the instructions comprising:
 one or more instructions that, when executed by one or more processors, cause the one or more processors to:

determine an initial signal parameter value of a signal received from a base station,
the initial signal parameter value being a single measurement;
determine one or more subsequent signal parameter values corresponding to one or more signals received from the base station,
the one or more signals being received after the signal, and
the initial signal parameter value and the one or more subsequent signal parameter values being based on different measurements;
calculate a filtered signal parameter value based on the initial signal parameter value and the one or more subsequent signal parameter values,
each signal parameter value, of the one or more subsequent signal parameter values, being weighted by an amount greater than or equal to a previously measured signal parameter value; and
provide the filtered signal parameter value in a measurement report.

9. The non-transitory computer-readable medium of claim 8, where the one or more subsequent signal parameter values includes a subsequent signal parameter value; and
where the one or more instructions, that cause the one or more processors to calculate the filtered signal parameter value, cause the one or more processors to:
apply a first weight value to the initial signal parameter value;
apply a second weight value to the subsequent signal parameter value,
where applying the second weight value weights the subsequent signal parameter value by an amount greater than or equal to applying the first weight value to the initial signal parameter value; and
calculate the filtered signal parameter value based on applying the first weight value to the initial signal parameter value and applying the second weight value to the subsequent signal parameter value.

10. The non-transitory computer-readable medium of claim 8, where the base station includes at least one of a serving base station or a neighbor base station.

11. The non-transitory computer-readable medium of claim 8, where the one or more instructions, that cause the one or more processors to calculate the filtered signal parameter value, cause the one or more processors to:
determine a weight value, to be applied to a signal parameter value, of the initial signal parameter value or the one or more subsequent signal parameter values, based on:
a derived filter coefficient value, and
a quantity of measured signal parameter values; and
calculate the filtered signal parameter value based on the weight value.

12. The non-transitory computer-readable medium of claim 11, where the one or more instructions, that cause the one or more processors to determine the weight value, cause the one or more processors to:
compare the derived filter coefficient value and a reciprocal of the quantity of measured signal parameter values; and
determine the weight value based on comparing the derived filter coefficient value and the reciprocal of the quantity of measured signal parameter values.

13. The non-transitory computer-readable medium of claim 12, where the one or more instructions, when executed by the one or more processors, cause the one or more processors to:
set the weight value equal to a greater of the derived filter coefficient value and the reciprocal of the quantity of measured signal parameter values.

14. The non-transitory computer-readable medium of claim 11, where the derived filter coefficient value is determine based on:

$$a = \frac{1}{2}^{(k/4)},$$

where a represents the derived filter coefficient value and k represents a filter coefficient value.

15. A method, comprising:
determining, by a user equipment, a first signal parameter value of a first signal received from a base station,
the first signal parameter value being determined based on a first measurement to be used to calculate a filtered signal parameter value to be reported in a measurement report,
the first measurement being a single measurement;
determining, by the user equipment, a second signal parameter value of a second signal received from the base station,
the second signal parameter value being determined based on a second measurement following the first measurement,
the second measurement being a single measurement;
applying, by the user equipment, a first weight value to the first signal parameter value;
applying, by the user equipment, a second weight value to the second signal parameter value,
where the second weight value is greater than or equal to the first weight value;
calculating, by the user equipment, the filtered signal parameter value based on applying the first weight value to the first signal parameter value and applying the second weight value to the second signal parameter value; and
providing, by the user equipment, the filtered signal parameter value in the measurement report.

16. The method of claim 15, where the filtered signal parameter value does not incorporate any signal parameter values measured prior to the first signal parameter value.

17. The method of claim 15, where the first weight value and the second weight value are determined based on:
a derived filter coefficient value, and
a quantity of measured signal parameter values.

18. The method of claim 17, further comprising:
receiving a filter coefficient value from the base station; and
determining the derived filter coefficient value based on the filter coefficient value.

19. The method of claim 15, where the first weight value and the second weight value are determined based on determining a greater of:
a derived filter coefficient value, and
a reciprocal of a quantity of measured signal parameter values.

20. The method of claim 15, where the first weight value and the second weight value are determined based on:

$$a_n = a/[1-(1-a)^n],$$

where $a_n$ represents a weight value for an $n^{th}$ sample,
where a represents a derived filter coefficient value, and where n represents a quantity of measured signal parameter values.

\* \* \* \* \*